Dec. 3, 1935.  A. KNEIP  2,023,175
GLASS ARTICLES PROVIDED WITH DESIGNS
Filed June 30, 1933
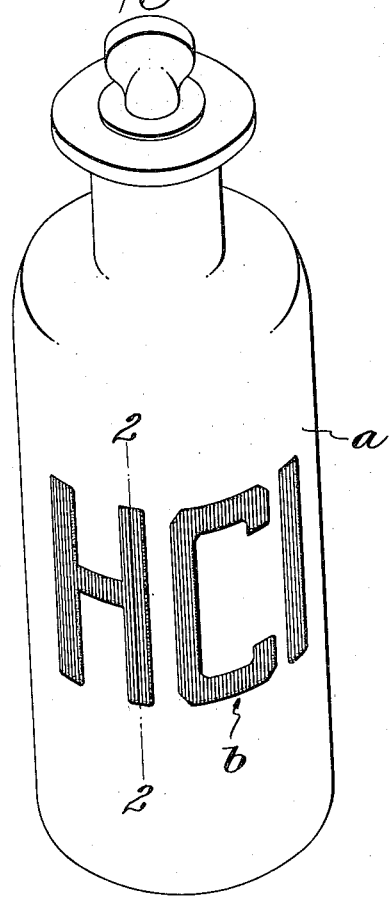
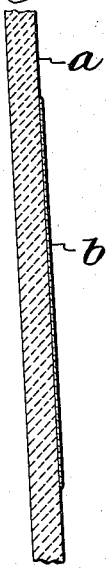
Inventor
Alex Kneip,
By Byrnes, Townsend & Potter,
Attorneys.

Patented Dec. 3, 1935

2,023,175

UNITED STATES PATENT OFFICE 2,023,175

GLASS ARTICLES PROVIDED WITH DESIGNS

Alex Kneip, Frankfort-on-the-Main-Hochst, Germany, assignor to Winthrop Chemical Company, Inc., New York, N. Y., a corporation of New York Application June 30, 1933, Serial No. 678,517
In Germany June 30, 1932

2 Claims. (Cl. 41—26)

My present invention relates to glass articles provided with designs, such as characters, inscriptions, trade marks, pictures or the like.

The commercial marking inks used for imprinting glass have the drawback that even after a prolonged drying the imprints produced with them can very easily be removed by means of organic solvents, such as alcohol, hot water or the like. In the case of ampoules carrying designs and filled with injecting solution, for instance, the small fastness to alcohol entails the disadvantage that the hands of the consumer (physician) become colored, when the ampoule is disinfected as usual with alcohol at the place of cut. Moreover, the design is washed off from ampoules, glass apparatus or the like if they are sterilized in boiling water or a current of steam.

According to my invention, designs which are stable to organic solvents and to water even at boiling temperature are produced on glass by means of a printing paste containing a liquid hardenable resin condensation product, in the beginning stage of the condensation, a high boiling solvent, a soft filling agent and a dyestuff pigment, and the resin is then subsequently hardened by heating it to a temperature which is sufficient to render the artificial resin insoluble in boiling water and alcohol.

Artificial resins capable of being subsequently hardened are, for instance: the condensation products from phenol and formaldehyde, from urea and formaldehyde and from glycerine and phthalic acid.

High boiling solvents, the addition of which has the purpose of preventing a too quick drying of the dyestuff paste, are, for instance: glycerine, amyl alcohol or propyl alcohol.

As soft filling agents there may be used polyglycerine, glycol or asbestos powder.

The designs may be applied by hand or mechanically, for instance, by means of the usual pressure devices. They are subsequently hardened by a heat treatment the duration of which depends on the temperature applied. They may, for instance, be hardened by a prolonged action at a temperature of between 160° C. and 180° C. or by shortly passing them along a heating device or through a heating chamber heated, for instance, to a temperature between 250° C. and 350° C.

The drawing shows one embodiment of the invention.

Fig. 1 is a perspective view of a glass bottle, and

Fig. 2 is a section along the line 2—2 of Fig. 1.

In the drawing, $a$ designates the bottle and $b$ designates an inscription thereon.

The following examples illustrate the invention; the parts being by weight:

(1) 500 parts of an azo dyestuff from diazotized naphthionic acid and beta-naphthol and 1200 parts of a barium lake of an azo dyestuff from diazotized 2-chloro-5-aminotoluene-4-sulfonic acid and beta-naphthol are intimately mixed with 2800 parts of a condensation product from phenol and formaldehyde in the A-stage prepared in the usual manner, 1200 parts of glycerine, 300 parts of micro-asbestos and 200 parts of titanium white. The red paste thus obtained is applied to glass ampoules in the form of characters by means of a printing apparatus and the characters thus produced are then hardened by shortly passing the ampoules along a heating device heated to a temperature between about 250° C. and about 350° C. The characters are insoluble both in boiling water and in alcohol.

(2) 700 parts of red iron oxide ($Fe_2O_3$) and 100 parts of a barium lake of an azo dyestuff from diazotized 2-chloro- 5 -aminotoluene- 4 -sulfonic acid and beta-naphthol are intimately mixed with 1000 parts of a condensation product from phenol and formaldehyde in the A-stage made in the usual manner, 400 parts of glycerine, 150 parts of micro-asbestos and 100 parts of titanium white. The red paste thus obtained is applied onto glass ampoules in the form of characters with the aid of a printing apparatus and the characters produced are then hardened by shortly passing the ampoules along a heating device heated to a temperature between about 250° C. and about 350° C. The characters are insoluble in boiling water and in alcohol.

(3) 780 parts of chromic oxide, 130 parts of N-dihydro-1.2.1′.2′-anthraquinoneazine and 180 parts of an azo dyestuff from 1 molecular proportion of tetrazotized 3.3′-dichlorobenzidine and 2 molecular proportions of acetic acid-meta-xylidide are made into a green paste with 1120 parts of a condensation product made in the usual manner from phenol and formaldehyde in the A-stage, 200 parts of micro-asbestos, 80 parts of titanium white and 480 parts of glycerine. With the aid of this dyestuff paste characters are applied onto a glass vessel which are then hardened at a temperature of between 160° C. and 180° C. The characters are insoluble in boiling water and in alcohol.

(4) 740 parts of lead chromate, 720 parts of an azo dyestuff from 1 molecular proportion of tetrazotized 3.3′-dichlorbenzidine and 2 molecular proportions of acetic-acid-meta-xylidide are mixed with 1680 parts of a condensation product from phenol and formaldehyde in the A-stage made in the usual manner, 240 parts of micro-asbestos, 100 parts of titanium white and 720 parts of glycerine. A yellow paste is obtained. By means of this paste insoluble inscriptions are applied onto glass objects in the manner described in Examples 1 or 2.

(5) 625 parts of gas-carbon-black are made into a black paste with 1750 parts of a condensation product from phenol and formaldehyde in the A-stage made in the usual manner, 125 parts of micro-asbestos and 750 parts of glycerine. The paste is used in the manner described in Examples 1 or 2 for applying insoluble designs on glass plates or similar objects.

I claim:

1. Glass objects provided with a design containing an artificial resin hardened to an insoluble and infusible state, a soft filling agent and a dyestuff pigment.

2. Glass objects provided with a design containing a condensation product from phenol and formaldehyde hardened to an insoluble and infusible state, asbestos powder and a dyestuff pigment.

ALEX KNEIP.